US008964684B2

(12) United States Patent
Kim et al.

(10) Patent No.: US 8,964,684 B2
(45) Date of Patent: Feb. 24, 2015

(54) METHOD AND APPARATUS FOR PROVIDING CONTROL INFORMATION

(75) Inventors: Jinmin Kim, Anyang-si (KR); Takki Yu, Anyang-si (KR); Sungho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 13/885,816

(22) PCT Filed: Nov. 16, 2011

(86) PCT No.: PCT/KR2011/008765
§ 371 (c)(1), (2), (4) Date: May 16, 2013

(87) PCT Pub. No.: WO2012/067430
PCT Pub. Date: May 24, 2012

(65) Prior Publication Data
US 2013/0242924 A1 Sep. 19, 2013

Related U.S. Application Data

(60) Provisional application No. 61/414,383, filed on Nov. 16, 2010.

(51) Int. Cl.
*H04W 4/00* (2009.01)
*H04W 72/04* (2009.01)
*H04B 7/26* (2006.01)
*H04W 72/00* (2009.01)

(52) U.S. Cl.
CPC .......... *H04W 72/042* (2013.01); *H04B 7/2656* (2013.01)
USPC .......................................... 370/329; 455/450

(58) Field of Classification Search
None
See application file for complete search history.

(56) References Cited

U.S. PATENT DOCUMENTS

2011/0212731 A1* 9/2011 Lee et al. .................... 455/450
2012/0063403 A1* 3/2012 Moon et al. .................. 370/329
2012/0069803 A1* 3/2012 Iwamura et al. ............. 370/329
2012/0142364 A1* 6/2012 Duan ........................... 455/450
2012/0213189 A1* 8/2012 Choi et al. .................. 370/329
2012/0230288 A1* 9/2012 Suh ............................. 370/329

(Continued)

OTHER PUBLICATIONS

Ericsson, et al., "Details of almost blank subframes," 3GPP TSG-RAN WG1 #62bis, R1-105335, Oct. 2010, 6 pages.

(Continued)

*Primary Examiner* — Clemence Han
(74) *Attorney, Agent, or Firm* — Lee, Hong, Degerman, Kang & Waimey

(57) ABSTRACT

The present invention relates to a wireless communication system. More particularly, the present invention relates to a method and an apparatus for a macro base station transmitting control information, comprising the following steps: transmitting to a pico base station assignment information regarding a first set of subframes with limited downlink signal transmission; transmitting to the pico base station assignment information regarding a second set of subframes which belong to a first set of subframes; and transmitting the control information by means of the first set of subframes, wherein the control information for the macro base station is transmitted from subframes in the first set of subframes which do not belong to the second set of subframes, and the control information for the pico base station is transmitted from the subframes in the first set of subframes which belong to the second set of subframes.

14 Claims, 12 Drawing Sheets

(56) References Cited

U.S. PATENT DOCUMENTS

| | | | | |
|---|---|---|---|---|
| 2012/0295629 | A1* | 11/2012 | Lee et al. | 455/450 |
| 2013/0208686 | A1* | 8/2013 | Zhang et al. | 370/329 |
| 2013/0223258 | A1* | 8/2013 | Seo et al. | 370/252 |

OTHER PUBLICATIONS

Ericsson, et al., "On Macro-Femto interference handling," 3GPP TSG-RAN WG1 #62bis, R1-105746, Oct. 2010, 4 pages.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.1.0, Sep. 2010, 192 pages. (relevant sections: pp. 113-115).

PCT International Application No. PCT/KR2011/008765, Written Opinion of the International Searching Authority dated May 25, 2012, 15 pages.

* cited by examiner

Radio frame
Slot
#0
#1
#2
...
#18
#19
Sub-frame
(a)
One radio frame, T_s=307200T = 10ms
One half-frame, T_s=153600T = 5ms
30720T_s
One slot, T_slot=15360T_s
Subframe#0
Subframe#2
Subframe#3
Subframe#4
Subframe#5
Subframe#7
Subframe#8
Subframe#9
DwPTS
GP
UpPTS
DwPTS
GP
UpPTS
One subframe, 30720T_s
(b)

Inter-cell interference (dotted line)

| Subframe number | 0 | 1 | 2 | 3 | 4 | ... | 38 | 39 |
|---|---|---|---|---|---|---|---|---|
| ABS indication bit | 0 | 1 | 0 | 1 | 0 | ... | 1 | 0 |
| ISP indication bit | 0 | 0 | 0 | 1 | 0 | ... | 1 | 0 |
| Reduced ISP indication bit | 0 | 1 | 0 | | | | | |

| Subframe number | 0 | 1 | 2 | 3 | 4 | ... | 38 | 39 |
|---|---|---|---|---|---|---|---|---|
| ABS indication bit | 0 | 1 | 0 | 1 | 0 | ... | 1 | 0 |

ISP

METHOD AND APPARATUS FOR PROVIDING CONTROL INFORMATION

CROSS-REFERENCE TO RELATED APPLICATIONS

This application is the National Stage filing under 35 U.S.C. 371 of International Application No. PCT/KR2011/008765, filed on Nov. 16, 2011, which claims the benefit of U.S. Provisional Application Ser. No. 61/414,383, filed on Nov. 16, 2010, the contents of which are all hereby incorporated by reference herein in their entirety.

TECHNICAL FIELD

The present invention relates to a wireless communication system, and more particularly, to a method of providing control information an apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

One object of the present invention is to provide a method of providing control information and apparatus therefor in a wireless communication system. Another object of the present invention is to provide a method of efficiently providing control information and apparatus therefor in a heterogeneous network.

Technical tasks obtainable from the present invention are non-limited the above-mentioned technical task. And, other unmentioned technical tasks can be clearly understood from the following description by those having ordinary skill in the technical field to which the present invention pertains.

Technical Solution

Accordingly, the present invention is directed to an apparatus for and method thereof that substantially obviate one or more of the problems due to limitations and disadvantages of the related art.

To achieve these and other advantages and in accordance with the purpose of the present invention, as embodied and broadly described, according to one embodiment a method of transmitting a control information, which is transmitted by a macro base station in a wireless communication system including the macro base station and a pico base station includes the steps of transmitting an assignment information regarding a subframe of a $1^{st}$ set, which is limited to transmit a downlink signal, to the pico base station, transmitting an assignment information regarding a subframe of a $2^{nd}$ set belonging to the subframe of the $1^{st}$ set to the pico base station, and transmitting a control information via the subframe of the $1^{st}$ set, wherein the control information for the macro base station is transmitted in the subframe not corresponding to the subframe of the $2^{nd}$ set among the subframe of the $1^{st}$ set and wherein the control information for the pico base station is transmitted in the subframe corresponding to the subframe of the $2^{nd}$ set among the subframe of the $1^{st}$ set.

To further achieve these and other advantages and in accordance with the purpose of the present invention, according to a different embodiment a communication device includes a radio frequency (RF) unit and a processor, the processor configured to transmit an assignment information regarding a subframe of a $1^{st}$ set, which is limited to transmit a downlink signal, to the pico base station, the processor configured to transmit an assignment information regarding a subframe of a $2^{nd}$ set belonging to the subframe of the $1^{st}$ set to the pico base station, the processor configured to transmit a control information via the subframe of the $1^{st}$ set.

Preferably, the subframe of the $1^{st}$ set is an ABS (almost blank subframe). Preferably, the assignment information on the subframe of the $1^{st}$ set includes a 40-bit bitmap and each bit of the bitmap is set to indicate the ABS or a non-ABS by a corresponding subframe.

Preferably, the assignment information regarding the subframe of the $2^{nd}$ set is provided using a bitmap of identical size with the bitmap used to indicate the assignment information regarding the subframe of the $1^{st}$ set.

Preferably, the subframe of the $1^{st}$ set is indicated using an N bit bitmap, the subframe of the $2^{nd}$ set is indicated using an M bit bitmap, and the M is provided by the number of bit indicating the subframe limited to transmit the downlink signal among the N bit.

Preferably, the control information for the pico base station includes at least one selected from the group consisting of a cell ID (identity), a CP (cyclic prefix) length, a PCFICH (physical control format indicator channel), an antenna configuration, a PHICH (physical HARQ indicator channel) configuration, and a frame number.

Preferably, if the subframe of the $2^{nd}$ set is assigned on a $1^{st}$ carrier resource, the control information related to a $2^{nd}$ carrier resource of the pico base station is transmitted in the subframe of the $2^{nd}$ set and the $1^{st}$ carrier resource and the $2^{nd}$ carrier resource are different from each other.

It is to be understood that both the foregoing general description and the following detailed description are exemplary and explanatory and are intended to provide further explanation of the invention as claimed.

Advantageous Effects

According to the present invention, a method of providing control information and an apparatus therefor in a wireless communication system can be provided. More particularly, control information can be efficiently provided in a heterogeneous network.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the present invention and are incorporated in and constitute a part of this specification, illustrate embodiments of the present invention and together with the description serve to explain the principles of the invention.

BEST MODE MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. And, specific terminologies used in the following description are provided to help understanding of the present invention and the use of the specific terminology can be modified to a different form within the scope of the technical idea of the present invention.

Figure 1:
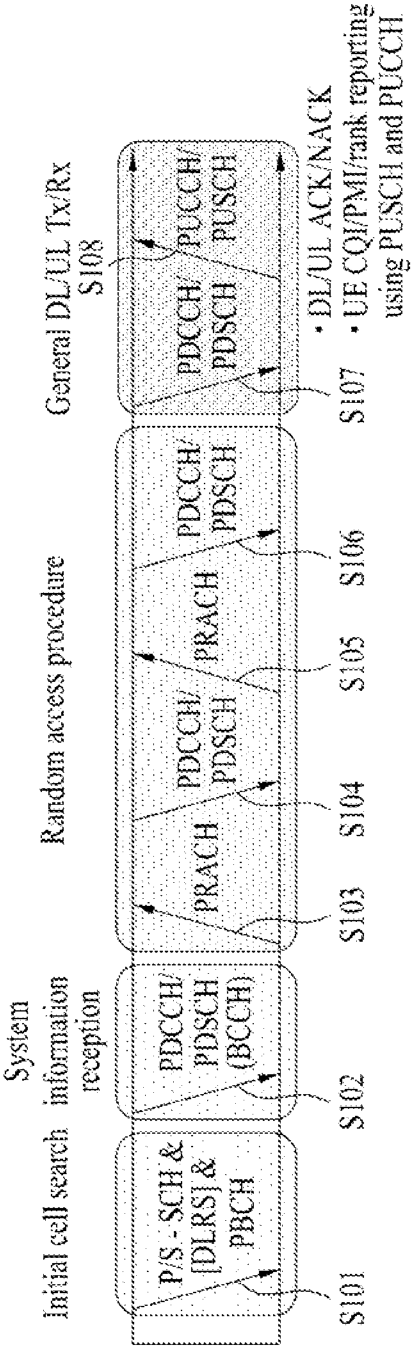
FIG. 1 is a diagram for explaining an example of physical channels used for 3GPP LTE system and a general signal transmission method using the same.

FIG. 1 is a diagram for explaining an example of physical channels used for 3GPP LTE system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel (PBCH) from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared channel (PDSCH) according to the physical downlink control channel (PDCCH) and may be then able to obtain a detailed system information [S102].

Meanwhile, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indicator), PMI (Precoding Matrix Indicator), RI (Rank Indication), and the like. In the present specification, HARQ ACK/NACK can be simply called HARQ-ACK, ACK/NACK (A/N). HARQ-ACK may include at least one selected from the group consisting of a positive ACK (simply, ACK), a negative ACK (NACK), a DTX, and a NACK/DTX. In general, the UCI is transmitted on PUCCH. Yet, in case that control information and traffic data need to be simultaneously transmitted, the UCI can be transmitted on PUSCH. And, the UCI can be nonperiodically transmitted on PUSCH by the request/indication of a network.

Figure 2:
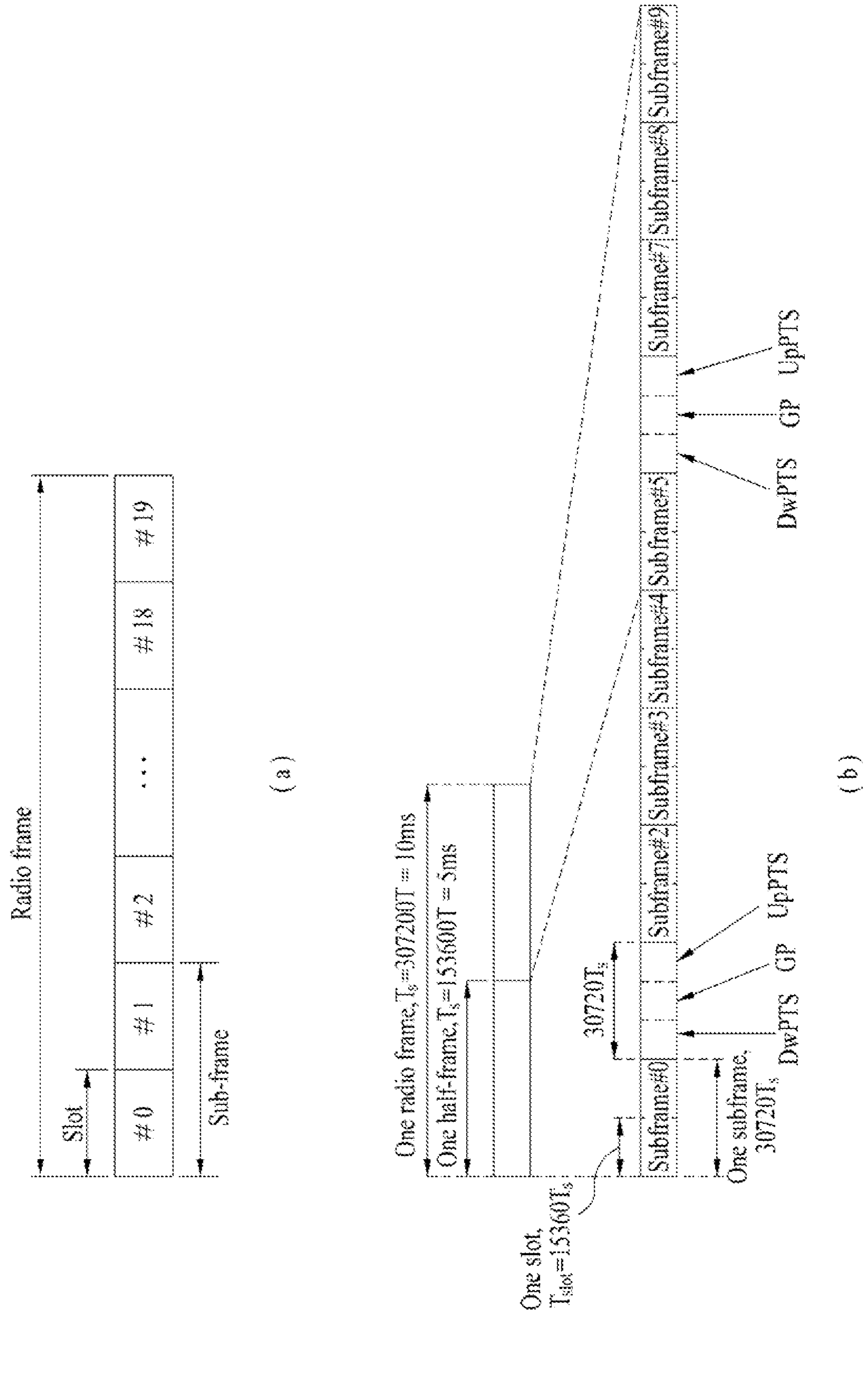
FIG. 2 is a diagram for explaining an example of a structure of a radio frame.

FIG. 2 is a diagram for explaining an example of a structure of a radio frame. In a cellular OFDM radio packet communication system, UL/DL (uplink/downlink) data packet transmission is performed by a unit of subframe and one subframe is defined as a predetermined time interval including a plurality of OFDM symbols. According to 3GPP LTE standard, a type-1 radio frame structure applicable to FDD (frequency division duplex) and a type-2 radio frame structure applicable to TDD (time division duplex) are supported by the 3GPP LTE standard.

FIG. 2(*a*) is a diagram for a structure of a radio frame of type 1. A DL (downlink) radio frame includes 10 subframes. Each of the subframes includes 2 slots in time domain. Time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol period. The OFDM symbol may be named SC-FDMA symbol or symbol period. Resource block (RB) as a resource allocation unit and may include a plurality of contiguous subcarriers in one slot.

The number of OFDM symbols included in one slot may vary in accordance with a configuration of CP (Cyclic Prefix). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2(*b*) is a diagram for a structure of a radio frame of type 2. A type-2 radio frame includes 2 half frames. Each of the half frames includes 5 subframes, DwPTS (downlink pilot time slot), GP (guard period) and UpPTS (uplink pilot time slot) and one subframe includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The structure of the radio frame is exemplary only. And, the number of subframes included in a radio frame, the number of slots included in the subframe and the number of symbols included in the slot may be modified in various ways.

Figure 3:
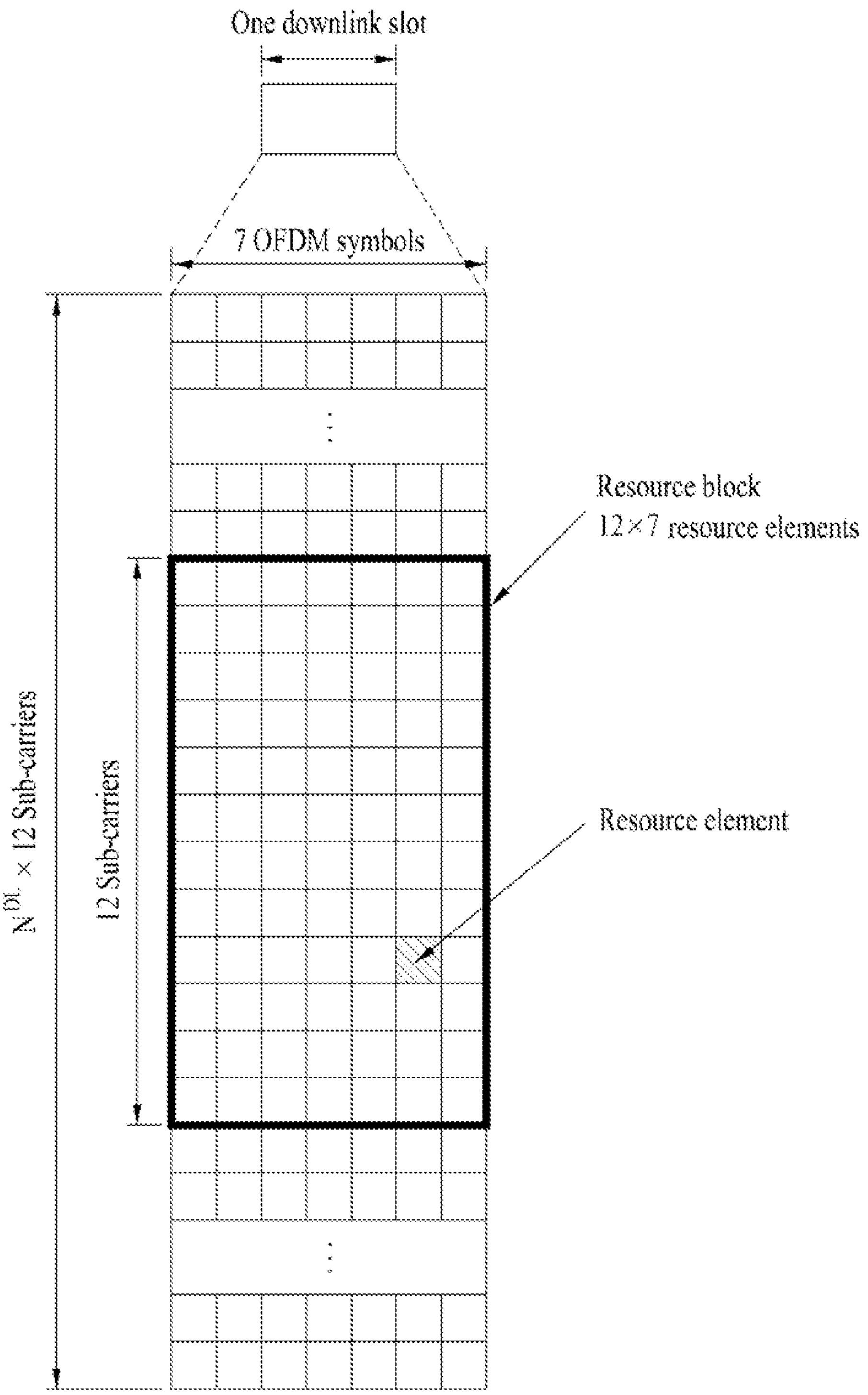
FIG. 3 is a diagram for one example of a resource grid for a downlink slot.

FIG. 3 is a diagram for one example of a resource grid for a downlink slot.

Referring to FIG. 3, one downlink (DL) slot may include a plurality of OFDM symbols in time domain. One DL slot may include 7 (6) OFDM symbols and one resource block (RB) may include 12 subcarriers in frequency domain. Each element on a resource grid is called a resource element (hereinafter abbreviated RE). One resource block includes 12×7 (6) resource elements. The number $N^{DL}$ of resource blocks included in a DL slot may depend on a DL transmission bandwidth. And, the structure of an uplink (UL) slot may be identical to that of the DL slot and OFDM symbol is replaced by SC-FDMA symbol.

Figure 4:
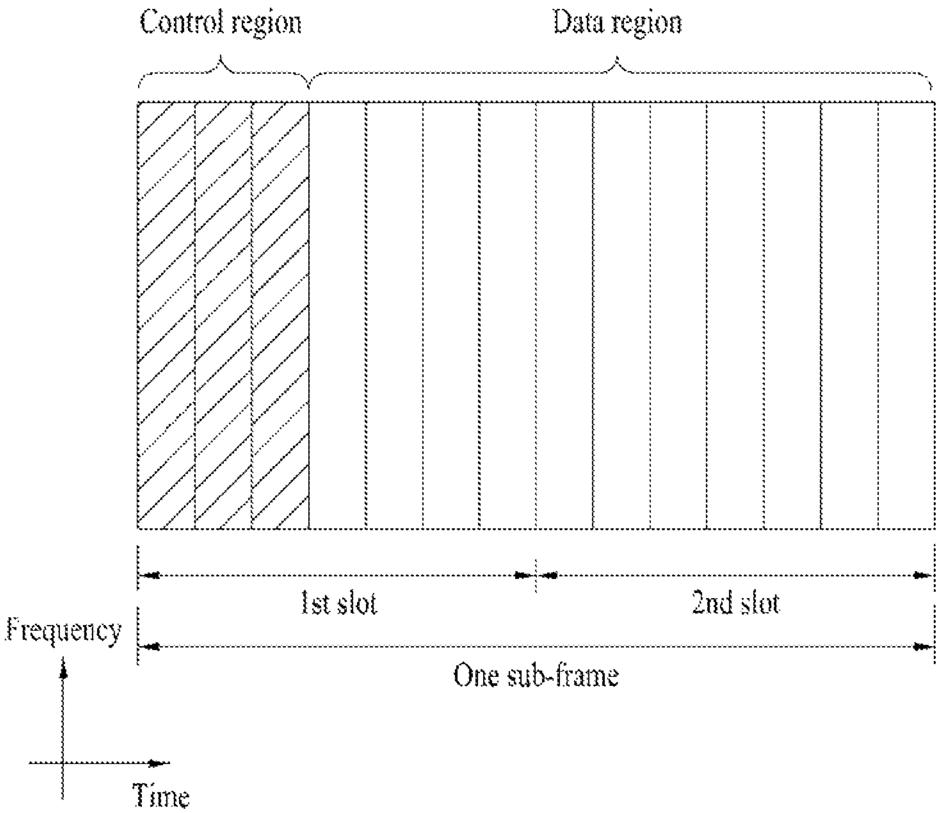
FIG. 4 is a diagram for a structure of a downlink frame.

FIG. 4 is a diagram for a structure of a downlink subframe.

Referring to FIG. 4, maximum 3 (4) OFDM symbols situated in a head part of a first slot of one subframe correspond to a control region to which control channels are allocated. The rest of OFDM symbols correspond to a data region to which traffic channel (e.g., PDSCH (physical downlink shared channel)) is allocated. Examples of DL control channels used by LTE may include PCFICH (Physical Control Format Indicator Channel), PDCCH (Physical Downlink Control Channel), PHICH (Physical Hybrid automatic repeat request Indicator Channel) and the like.

Figure 5:
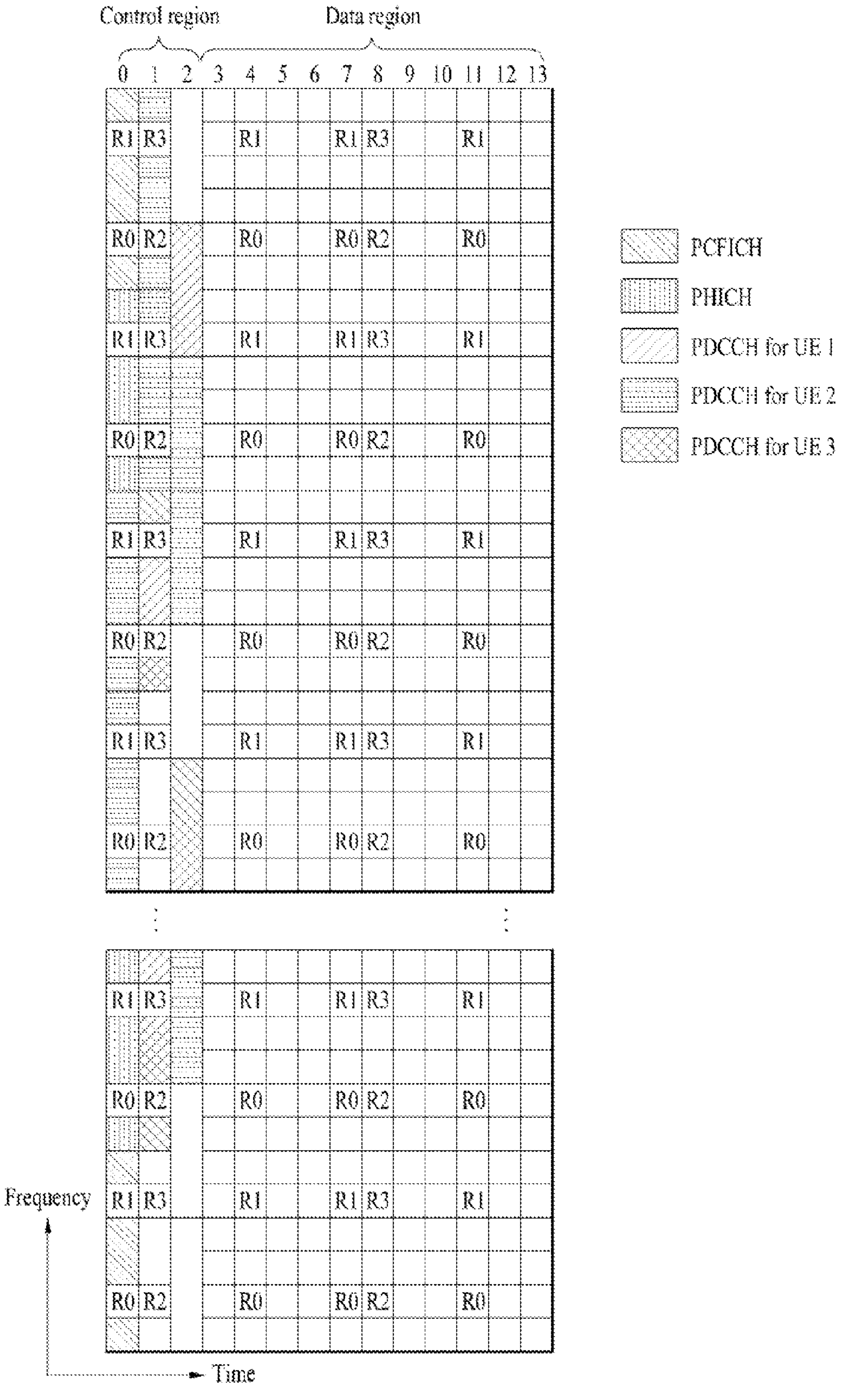
FIG. 5 is a diagram of a control channel assigned to a downlink subframe.

FIG. 5 is a diagram of a control channel assigned to a downlink subframe. R1 to R4 in the diagram indicates CRS (cell-specific reference signal or cell-common reference signal) for antenna port 0 to 3. The CRS is fixed as a constant pattern in a subframe irrespective of a control region and a data region. The control channel is assigned to a resource to which the CRS is not assigned in the control region and a traffic channel is also assigned to a resource to which the CRS is not assigned in the data region.

Referring to FIG. 5, PCFICH is transmitted in a first OFDM symbol of a subframe and carries information on the number of OFDM symbols used for a transmission of a control channel within the subframe. The PCFICH includes 4 REGs (resource element group) and each REG is equally distributed to the control region based on a cell ID. One REG consists of 4 adjacent REs except RS. The PCFICH indicates a value of 1 to 3 (or, 2 to 4) and is modulated by QPSK (Quadrature Phase Shift Keying).

Table 1 shows an example of a resource mapping relationship of the PCFICH according to a cell ID.

TABLE 1

| Cell ID Index \ REG INDEX | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|---|---|---|---|---|---|---|---|---|---|---|---|---|---|---|---|---|---|---|---|
| 0 | ■ | | | | | | | | | | ■ | | | | | | | | | | ■ | | | | | | | | | | ■ | | | | | | | | | |
| 1 | | ■ | | | | | | | | | | ■ | | | | | | | | | | ■ | | | | | | | | | | ■ | | | | | | | | |
| 2 | | | ■ | | | | | | | | | | ■ | | | | | | | | | | ■ | | | | | | | | | | ■ | | | | | | | |
| 3 | | | | ■ | | | | | | | | | | ■ | | | | | | | | | | ■ | | | | | | | | | | ■ | | | | | | |
| 4 | | | | | ■ | | | | | | | | | | ■ | | | | | | | | | | ■ | | | | | | | | | | ■ | | | | | |
| 5 | | | | | | ■ | | | | | | | | | | ■ | | | | | | | | | | ■ | | | | | | | | | | ■ | | | | |
| 6 | | | | | | | ■ | | | | | | | | | | ■ | | | | | | | | | | ■ | | | | | | | | | | ■ | | | |
| 7 | | | | | | | | ■ | | | | | | | | | | ■ | | | | | | | | | | ■ | | | | | | | | | | ■ | | |
| 8 | | | | | | | | | ■ | | | | | | | | | | ■ | | | | | | | | | | ■ | | | | | | | | | | ■ | |
| 9 | | | | | | | | | | ■ | | | | | | | | | | ■ | | | | | | | | | | ■ | | | | | | | | | | ■ |
| 10 | ■ | | | | | | | | | | ■ | | | | | | | | | | ■ | | | | | | | | | | ■ | | | | | | | | | |
| 11 | | ■ | | | | | | | | | | ■ | | | | | | | | | | ■ | | | | | | | | | | ■ | | | | | | | | |
| 12 | | | ■ | | | | | | | | | | ■ | | | | | | | | | | ■ | | | | | | | | | | ■ | | | | | | | |
| 13 | | | | ■ | | | | | | | | | | ■ | | | | | | | | | | ■ | | | | | | | | | | ■ | | | | | | |
| 14 | | | | | ■ | | | | | | | | | | ■ | | | | | | | | | | ■ | | | | | | | | | | ■ | | | | | |
| 15 | | | | | | ■ | | | | | | | | | | ■ | | | | | | | | | | ■ | | | | | | | | | | ■ | | | | |
| 16 | | | | | | | ■ | | | | | | | | | | ■ | | | | | | | | | | ■ | | | | | | | | | | ■ | | | |
| 17 | | | | | | | | ■ | | | | | | | | | | ■ | | | | | | | | | | ■ | | | | | | | | | | ■ | | |
| 18 | | | | | | | | | ■ | | | | | | | | | | ■ | | | | | | | | | | ■ | | | | | | | | | | ■ | |
| 19 | | | | | | | | | | ■ | | | | | | | | | | ■ | | | | | | | | | | ■ | | | | | | | | | | ■ |
| 20 | ■ | | | | | | | | | | ■ | | | | | | | | | | ■ | | | | | | | | | | ■ | | | | | | | | | |
| 21 | | ■ | | | | | | | | | | ■ | | | | | | | | | | ■ | | | | | | | | | | ■ | | | | | | | | |

The PHICH carries HARQ ACK/NACK (hybrid automatic repeat request acknowledgement/non-acknowledgement) signal in response to an uplink transmission. The PHICH is defined for the REG, which is remained after the PCFICH is assigned. The PHICH is assigned to the remained REG among at least one OFDM symbol configured by PHICH duration except the CRS and the PCFICH (a $1^{st}$ OFDM symbol). The PHICH is assigned to 3 REGs, which are equally distributed in frequency domain as much as possible.

PDCCH corresponds to a physical downlink control channel and is assigned to first n OFDM symbol. In this case, the n is an integer equal to 1 or greater than 1 and indicated by PCFICH. A control information transmitted on the PDCCH is called DCI (downlink control information). A DCI format is defined as a format 0 for the use of uplink and a format 1, 1A, 1B, 1C, 1D, 2, 2A, 3, 3A, and the like for the use of downlink. The DCI format selectively includes such information as a hopping flag, RB assignment, an MCS (modulation coding scheme), an RV (redundancy version), an NDI (new data indicator), a TPC (transmit power control), a cyclic shift DM RS (demodulation reference signal), a CQI (channel quality information) request, a HARQ process number, a TPMI (transmitted precoding matrix indicator), a PMI (precoding matrix indicator) confirmation according to a usage.

The PDCCH carries a transmission format of downlink shared channel (DL-SCH) and resource allocation information, the transmission format of uplink shared channel (UL-SCH) and resource allocation information, paging information on a paging channel (PCH), system information on the DL-SCH, resource allocation information of such an higher layer control message as a random access response transmitted on PDSCH, a set of Tx power control command for each of the user equipments in a UE group, a Tx power control command, VoIP (voice over IP) activation indication information and the like.

A base station determines the PDCCH format according to the DCI to be sent to a user equipment and attaches a CRC (cyclic redundancy check) to a control information. The CRC is masked with an identifier (e.g., RNTI (radio network temporary identifier)) according to an owner of the PDCCH or usage. For instance, in case that the PDCCH is for a specific user equipment, the identifier of the corresponding user equipment (e.g., a cell-RNTI (C-RNTI)) can mask the CRC. In case that the PDCCH is for a paging message, a paging identifier (e.g., a paging-RNTI (P-RNTI)) can mask the CRC. In case that the PDCCH is for a system information (more specifically, system information block (SIB)), an SI-RNTI (system information RNTI) can mask the CRC. In case that the PDCCH is for a random access response, RA-RNTI (random access-RNTI) can mask the CRC.

PBCH (physical broadcast channel) and SCH (synchronization channel) of an LTE system are explained in detail with reference to FIG. 6 and FIG. 7. The SCH includes a P-SCH and an S-SCH. A PSS (primary synchronization signal) is transmitted on the P-SCH and an SSS (secondary synchronization signal) is transmitted on the S-SCH.

Figure 6:
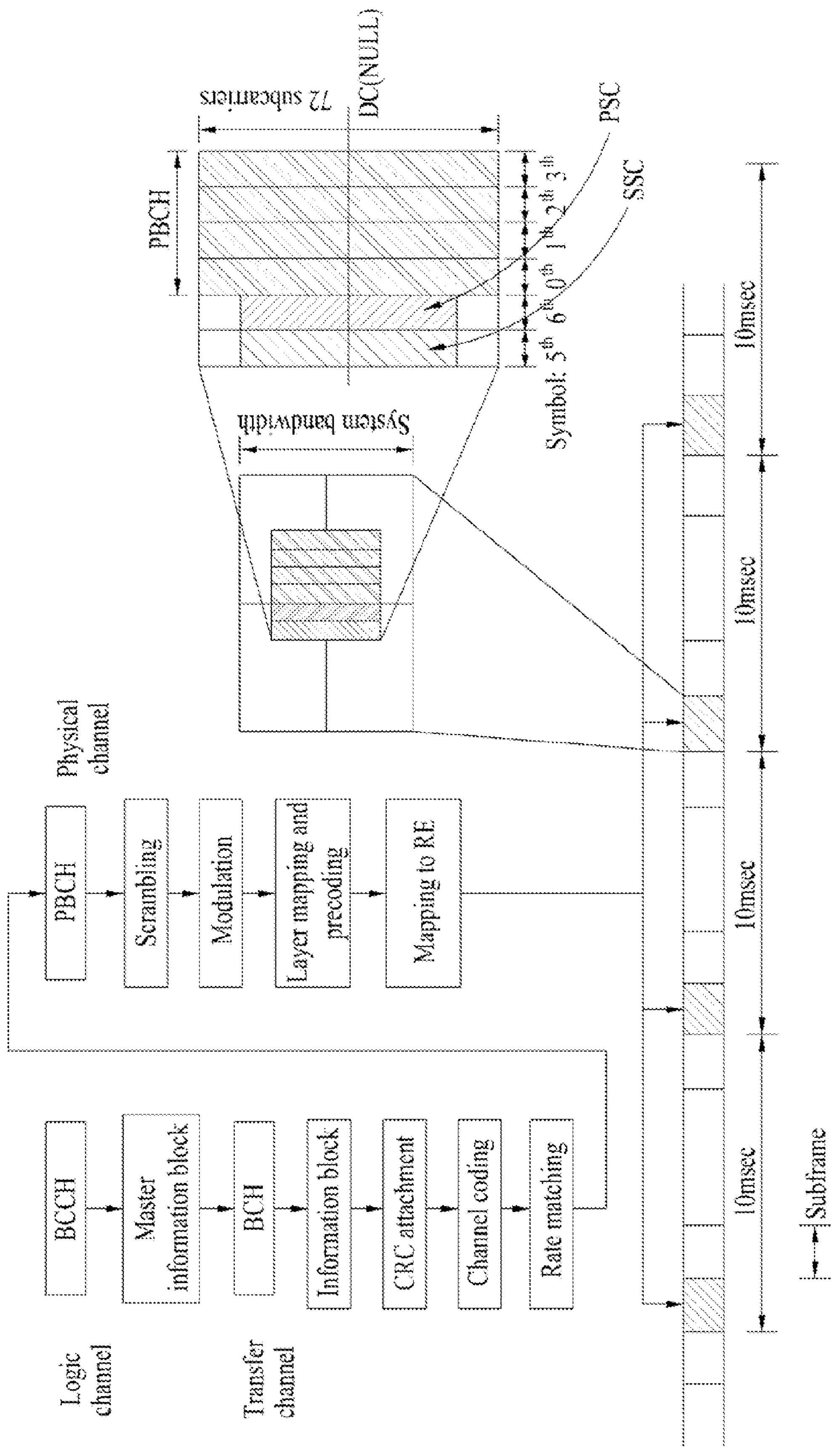
FIG. 6 and FIG. 7 are diagrams of PBCH (physical broadcast channel) and SCH (synchronization channel)

Referring to FIG. 6, content of the PBCH is expressed in an RRC layer as a master information block. Specifically, the content of the PBCH is shown in Table 2 as follows.

TABLE 2

```
-- ASN1START
MasterInformationBlock ::= SEQUENCE {
    dl-Bandwidth            ENUMERATED
                            n6,n15,n25,n50,n75,n100,spare2,spare1},
    phich-Configuration     PHICH-Configuration,
    systemFrameNumber       BIT STRING (SIZE (8)),
    spare                   BIT STRING (SIZE (10))
}
-- ASN1STOP
```

As shown in Table 2, the PBCH includes a downlink system bandwidth (dl-Bandwidth; DL BW), PHICH configuration, a system frame number (SFN). Hence, an LTE user equipment may be able to explicitly know information on the DL BW (downlink bandwidth), the SFN (system frame number), and the PHICH configuration. Meanwhile, the user equipment may be able to implicitly know the information on the number of transmitting antenna of a base station (# of transmit antenna ports at eNB) via a PBCH signal. The information on the number of transmitting antenna of the base station is implicitly signaled by masking (e.g., XOR calculation) a sequence corresponding to the number of transmitting antenna to a 16-bit CRC (cyclic redundancy check), which is used for detecting an error of the PBCH. A masking sequence per the number of antenna used in LTE is shown in Table 3 as follows.

TABLE 3

| Number of transmit antenna ports at eNode-B | PBCH CRC mask $\langle x_{ant,0}, x_{ant,1}, \ldots, x_{ant,15}\rangle$ |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

The PBCH is mapped to a physical resource after passing through a cell-specific scrambling, a modulation, a layer mapping, and a precoding. The PBCH in LTE uses a QPSK (quadrature phase shift keying) only as a modulation scheme. The PBCH is mapped to a resource element (k, l) indicated by a Formula 1.

$$k = \frac{N_{RB}^{DL} N_{sc}^{RB}}{2} - 36 + k', \quad k' = 0, 1, \ldots, 71, \quad l = 0, 1, \ldots, 3$$ [Formula 1]

In this case, 'l' is an OFDM symbol index of a slot 1 of $0^{th}$ subframe and 'k' is a subcarrier index. Formula 1 is an example of mapping in terms of one radio frame. A coded PBCH is mapped to 4 subframes for 40 ms as shown in FIG. 6. The 40 ms timing is blind detected. Thus, an explicit signaling for the 40 ms timing does not exist separately. As shown in Formula 1 and FIG. 6, the PBCH is mapped to 4 OFDM symbols and 72 subcarriers in one subframe. The PBCH is not mapped to RE at which a reference signal (RS) for 4 Tx antenna is situated irrespective of the number of practical transmitting antenna of a base station.

Figure 7:
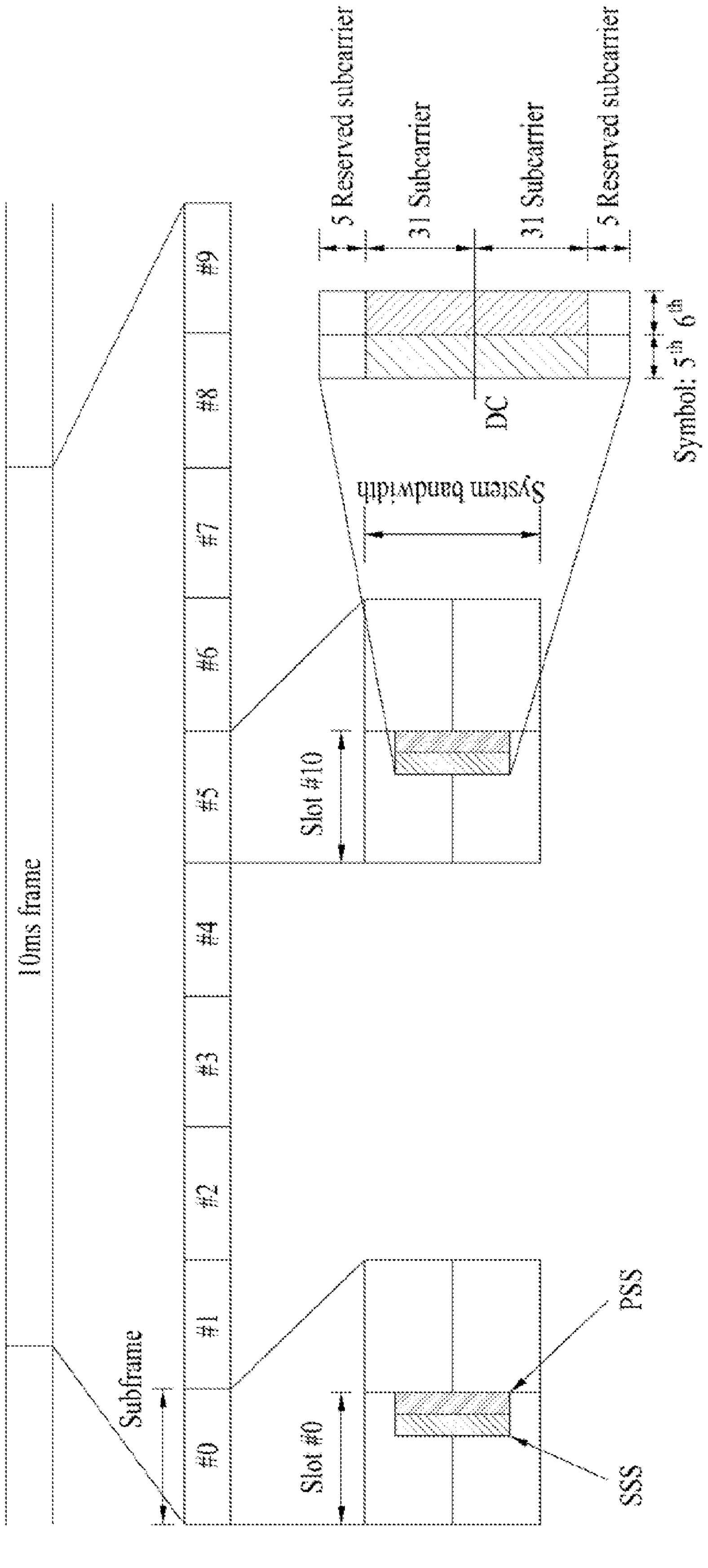

Referring to FIG. 7, P-SCH (primary synchronization channel) is situated at a last OFDM symbol of a $0^{th}$ slot and a $10^{th}$ slot. The P-SCH is transmitted using 72 subcarriers (10 subcarriers are reserved, PSS is transmitted on 62 subcarriers) in the corresponding OFDM symbol. An identical PSS (primary synchronization signal) is transmitted via 2 P-SCHs. A code used for the PSS can be called a PSC (primary synchronization code). The P-SCH is used to obtain such time domain synchronization as OFDM symbol synchronization, slot synchronization, and the like and/or frequency domain synchronization. A ZC (Zadoff-Chu) sequence can be used as the PSS and there exists at least one PSS in a wireless communication system.

The ZC sequence corresponds to one of a CAZAC (constant amplitude zero auto-correlation) sequence, which is an orthogonal sequence. If $N_{ZC}$ is a length of the CAZAC sequence, which is a positive integer, and a root index 'u' is a prime number compared to the $N_{ZC}$ ('u' is a natural number equal to the $N_{ZC}$ or less than the $N_{ZC}$ and a prime number with the $N_{ZC}$ to each other), $k^{th}$ element of $u^{th}$ CAZAC sequence can be expressed as shown in Formula 2 as follows ($k=0, 1, \ldots, N_{ZC}-1$).

$$d^u(k) = \exp\left\{-j\frac{\pi uk(k+1)}{N_{ZC}}\right\} \text{ when } N_{ZC} \text{ is odd number}$$ [Formula 2]

$$d^u(k) = \exp\left\{-j\frac{\pi uk^2}{N_{ZC}}\right\} \text{ when } N_{ZC} \text{ is even number}$$

The CAZAC sequence includes 3 characteristics as follows.

$$|d(k)| = 1 \text{ for all } k, N_{ZC}, u$$ [Formula 3]

$$R_{u;N_{ZC}}(m) = \begin{cases} 1, & \text{for } m = 0 \\ 0, & \text{for } m \neq 0 \end{cases}$$ [Formula 4]

$$R_{u_1;u_2;N_{ZC}}(m) = const \text{ for all } u_1, u_2$$ [Formula 5]

Formula 3 means that a size of the CAZAC sequence is always '1'. Formula 4 means that auto correlation of the CAZAC sequence is expressed by a Dirac-delta function. The auto correlation is based on a circular correlation. Formula 5 means that a cross correlation is always a constant number.

The P-SCH in LTE system is regulated as a ZC sequence of 62 lengths according to Formula 6.

$$d_u(n) = \begin{cases} e^{-j\frac{\pi un(n+1)}{63}} & n = 0, 1, \ldots, 30 \\ e^{-j\frac{\pi u(n+1)(n+2)}{63}} & n = 31, 32, \ldots, 61 \end{cases}$$ [Formula 6]

In this case, a root index u of the ZC sequence is provided as shown in Table 4 as follows.

TABLE 4

| $N_{ID}^{(2)}$ | Root index u |
|---|---|
| 0 | 25 |
| 1 | 29 |
| 2 | 34 |

Meanwhile, S-SCH (secondary synchronization channel) is situated at a preceding OFDM symbol of the last OFDM symbol of a $0^{th}$ slot and a $10^{th}$ slot. The S-SCH is transmitted using 72 subcarriers (10 subcarriers are reserved, SSS is transmitted on 62 subcarriers) in the corresponding OFDM symbol. SSS (secondary synchronization signal) different from each other is transmitted via 2 S-SCHs. The S-SCH is used to obtain frame synchronization, a cell group ID and/or a CP configuration of a cell (i.e., use information on a normal CP or extended CP). 2 SSSs are used for one S-SCH. Thus, last information is transmitted by a combination of 2 short codes (m0, m1). The code used for the SSS can be called a SSC (secondary synchronization code). As one example, the code used for the SSS can be generated a total of 31 codes by a circular shift of 31 lengths of m-sequence generated by a polynominal expression of 'x^5+x^2+1'. Hence, two of the 31 lengths m-sequence (m0, m1) can be mapped to one S-SCH. The order of the m0 and the m1 may indicate the information on frame timing. For instance, (m0, m1) means a synchronization channel of a $0^{th}$ (0 ms) subframe and (m1, m0) means a synchronization signal of $5^{th}$ (5 ms) subframe. The two codes (m0, m1) can be defined as shown in Formula 7 as follows.

$$m_0 = m' \bmod 31$$ [Formula 7]

$$m_1 = (m_0 + \lfloor m'/31 \rfloor + 1) \bmod 31$$

$$m' = N_{ID}^{(1)} + q(q+1)/2,$$

$$q = \left\lfloor \frac{N_{ID}^{(1)} + q'(q'+1)/2}{30} \right\rfloor,$$

$$q' = \lfloor N_{ID}^{(1)}/30 \rfloor$$

Relationship between a cell group ID and the two codes (m0, m1) can be defined as Table 5 as follows.

TABLE 5

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |

TABLE 5-continued

| $N_{ID}^{(1)}$ | $m_0$ | $m_1$ |
|---|---|---|
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |

TABLE 5-continued

| $N_{ID}^{(1)}$ | $m_0$ | $m_1$ |
|---|---|---|
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Figure 8:
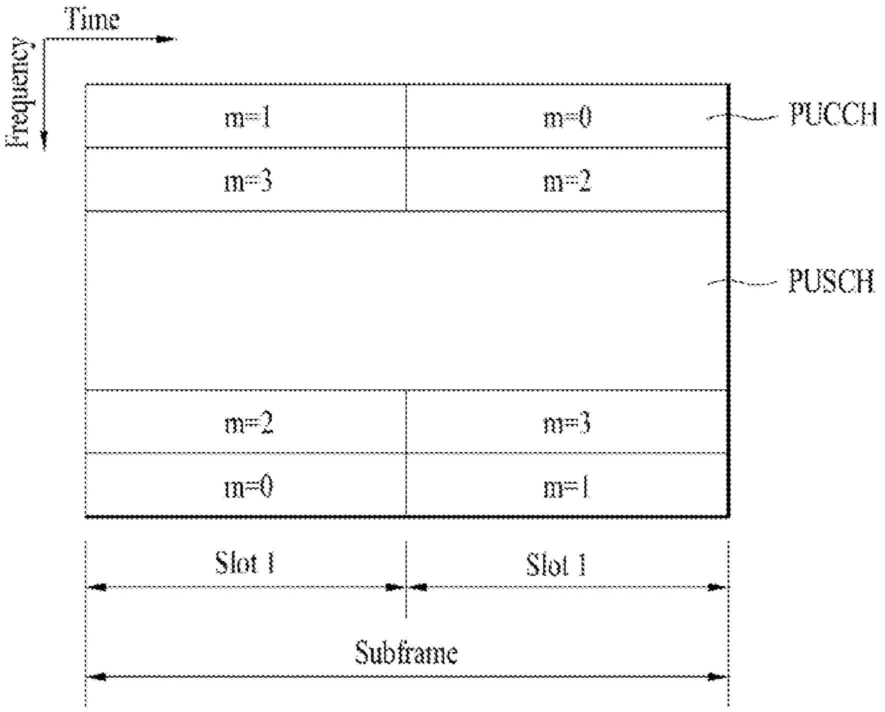
FIG. 8 is a diagram for a structure of an uplink subframe.

FIG. 8 is a diagram for a structure of an uplink subframe.

Referring to FIG. 8, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting control information. The PUCCH includes a RB pair situated at the both ends of the data region and hops on a slot boundary.

The PUCCH can be used for transmitting following control information.

SR (scheduling request): information used for making a request for an uplink UL-SCH resource. This information is transmitted using an OOK (on-off keying) scheme.

HARQ ACK/NACK: a response signal for a downlink data packet on PDSCH. This information indicates whether the downlink data packet is successively received. ACK/NACK 1 bit is transmitted in response to a single downlink codeword (CW) and ACK/NACK 2 bits are transmitted in response to two downlink codewords.

CQI (channel quality indicator): feedback information on a downlink channel. MIMO (multiple input multiple output)-related feedback information includes an RI (rank indicator), a PMI (precoding matrix indicator), a PTI (precoding type indicator), and the like. 20 bits per subframe are used for this information.

Figure 9:
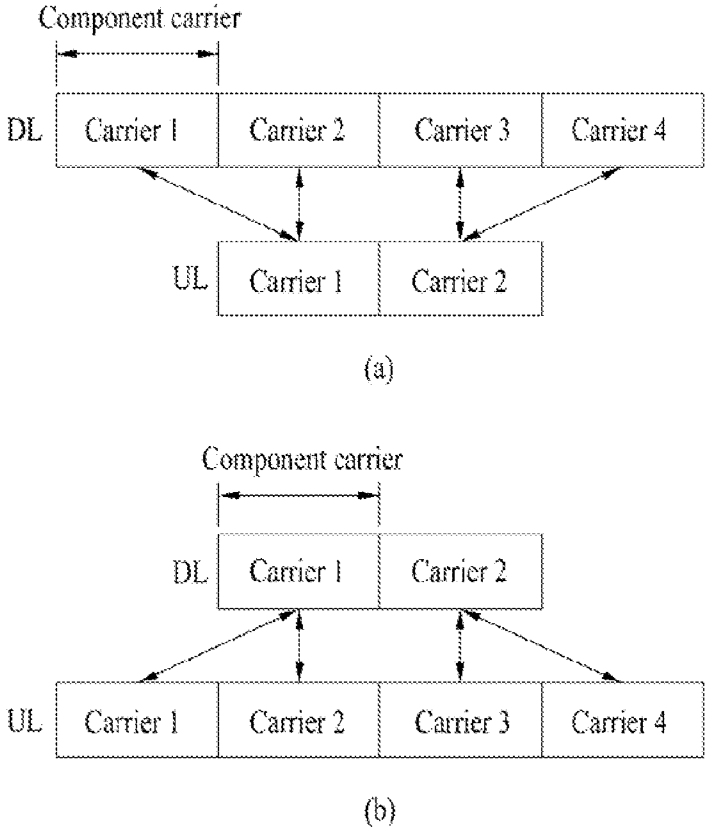
FIG. 9 is a diagram of an example of a carrier aggregation (CA) system.

FIG. 9 is a diagram of an example of a carrier aggregation (CA) system. LTE-A system uses a carrier aggregation (or bandwidth aggregation) technique using a greater uplink/downlink bandwidth to use a wider frequency bandwidth in a manner of collecting a plurality of uplink/downlink frequency bandwidths. Each of small frequency bandwidths is transmitted using a component carrier (CC). The component carrier can be comprehended as a carrier frequency (or, a center carrier, a center frequency) for a corresponding frequency block.

Each of the component carriers can be contiguous or non-contiguous with each other in frequency domain. Bandwidth of the CC can be limited to the bandwidth of a legacy system for a backward compatibility with the legacy system. For instance, a legacy 3GPP LTE supports a bandwidth of {1.4, 3, 5, 10, 15, and 20} MHz and LTE-A may be able to support a bandwidth bigger than 20 MHz in a manner of using the aforementioned bandwidths supported by LTE only. The bandwidth of each CC can be individually determined. It is possible to perform an asymmetrical carrier aggregation, which means that the number of DL CC and the number of UL CC is different from each other. DL CC/UL CC link can be configured to be fixed in a system or to be semi-static. For instance, as shown in FIG. 9(*a*), in case that there exist 4 DL CCs and 2 UL CCs, it may be possible to configure a DL-UL linkage to correspond to DL CC:UL CC=2:1. Similarly, as shown in FIG. 9(*b*), in case that there exist 2 DL CCs and 4 UL CCs, it may be possible to configure the DL-UL linkage to correspond to DL CC:UL CC=1:2. Unlike the depicted diagram, it is possible to perform a symmetrical carrier aggregation, which means that the number of DL CC and the number of UL CC are identical with each other. In this case, it is possible to configure the DL-UL linkage corresponding to DL CC:UL CC=1:1.

Although a whole bandwidth of a system is configured with N number of CC, a frequency band capable of being monitored/received by a specific user equipment can be limited to M (<N) number of CC. Various parameters for a carrier aggregation can be configured cell-specifically, UE group-specifically, or UE-specifically. Meanwhile, control information can be configured to be transceived only on a specific channel. The specific channel can be called a primary CC (PCC) and the rest of CC can be called a secondary CC (SCC).

LTE-A uses a concept of cell to manage a radio resource. The cell is defined as a combination of a DL and UL resource and the UL resource is not a mandatory element. Thus, the cell can be configured with the DL resource alone or the DL resource and the UL resource. In case of supporting the carrier aggregation, a linkage between a carrier frequency of the DL resource (or, DL CC) and the carrier frequency of the UL resource (or, UL CC) can be indicated by system information. The cell operating on a primary frequency (or, PCC) is called a primary cell (Pcell) and the cell operating on a secondary frequency (or SCC) is called a secondary cell (Scell). The Pcell is used for a user equipment to perform an initial connection establishment process or a connection re-establishment process. The Pcell may be an another name of a cell indicated in the process of a handover. The Scell can be configured after an RRC (radio resource control) connection is established and can be used to provide an additional radio resource. Both the Pcell and the Scell can be commonly called a serving cell. Hence, in case of a user equipment not configured with the carrier aggregation while staying in the state of RRC_CONNECTED or the user equipment not supporting the carrier aggregation, there exists only one serving cell configured with the Pcell. On the contrary, in case of the user equipment configured with the carrier aggregation and staying in the state of RRC_CONNECTED, there exists more than one serving cell. And, the Pcell and the Scell are included in the whole of the serving cell. In order to perform the carrier aggregation, after an initial security activation process started, a network may be able to configure one or more Scells for a carrier aggregation supportive of user equipment in addition to the Pcell, which is configured in the initial part of the connection establishment process.

Figure 10:
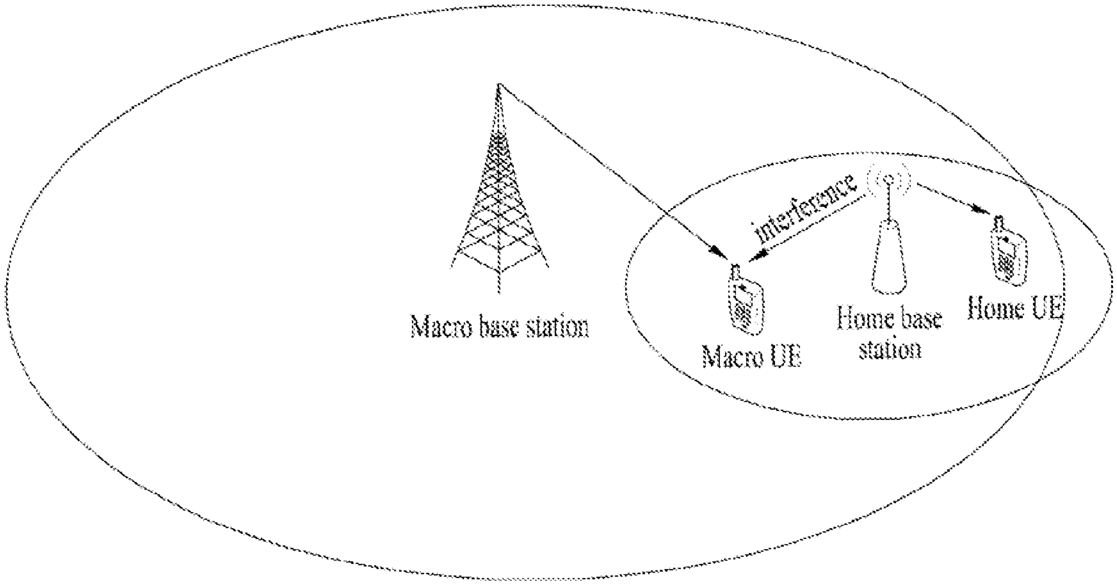
FIG. 10 is a diagram of an example of a heterogeneous network including a macro cell and a micro cell.

FIG. 10 is a diagram of an example of a heterogeneous network (HetNet) including a macro cell and a micro cell. A next generation communication standard including 3GPP LTE-A is discussing the heterogeneous network that the micro cell having the transmit power of low power exists within a coverage of the legacy macro cell in a manner of being overlapped.

Referring to FIG. 10, the macro cell can be overlapped with at least one micro cell. The service of the macro cell is provided by a macro base station (macro eNode B, MeNB). In the present specification, terminologies of the macro cell and the macro base station can be used in a manner of being mixed. A user equipment accessed the macro cell can be called a macro user equipment (macro UE). The macro UE receives a DL signal from the macro base station and transmits a UL signal to the macro base station.

The micro cell can be called a femto cell or a pico cell. The service of the micro cell is provided by a pico base station, a home base station (home eNode B, HeNB), a relay node (RN), and the like. For clarity, the pico base station (Pico eNodeB), the home base station (home eNode B, HeNB), and the relay node (RN) are commonly called as the home base station (HeNB). In the present specification, terminologies of the micro cell and the home base station (HeNB) can be used in a manner of being mixed. A user equipment accessed the micro cell can be called a micro user equipment or a home user equipment (home-UE). The home UE receives a DL signal from the home base station and transmits a UL signal to the home base station.

The micro cell can be divided into an OA (open access) cell and a CSG (closed subscriber group) cell according to accessibility. The OA cell means a micro cell capable of receiving a service by a user equipment whenever it is necessary without any separate access limit. On the contrary, the CSG cell means a micro cell capable of receiving a service by a specific user equipment only.

Since the macro cell and the micro cell are overlapped with each other in a heterogeneous network, inter-cell interference may cause more problems. As shown in FIG. 10, in case that the macro UE is situated at the boundary of the macro cell and the micro cell, the DL signal of the home base station acts like interference to the macro user equipment. Similarly, the DL signal of the macro base station may act like interference to the home UE within the micro cell. And, the UL signal of the macro UE may act like interference to the home base station. Similarly, the UL signal of the home UE may act like interference to the macro base station.

Figure 11:
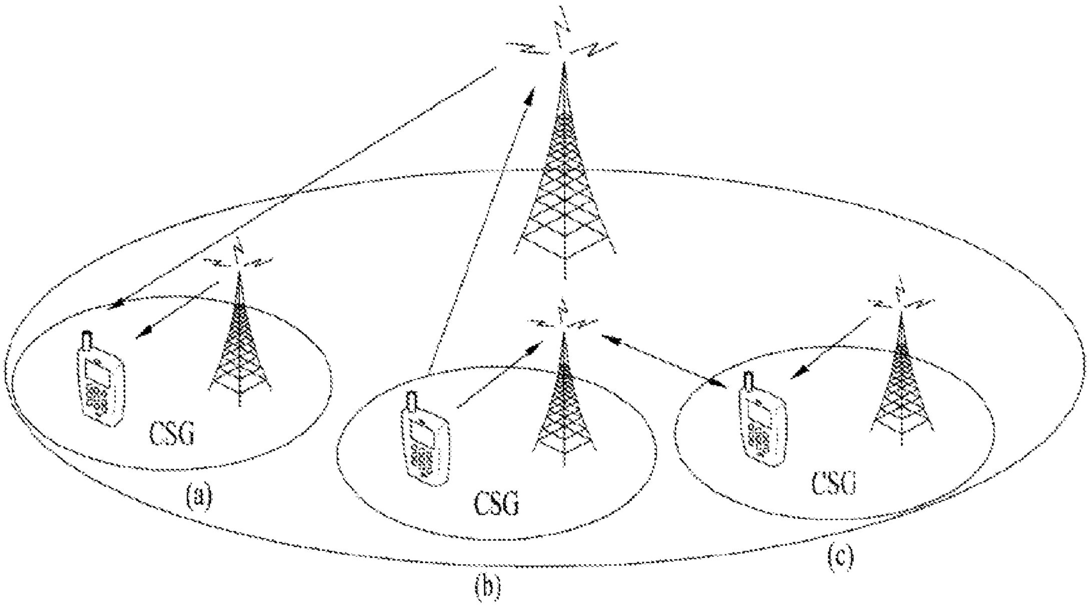
FIG. 11 is a diagram of an example of a situation for an inter-cell interference in a heterogeneous network.

FIG. 11 is a diagram of an example of a situation for inter-cell interference in a heterogeneous network. In the diagram, dotted line indicates a communication link and the dotted line indicates interference. Referring to FIG. 11, (a) a macro UE not accessing a CSG cell can be interfered by a home base station, (b) the macro UE may cause interfere to the home base station, and (c) a CSG UE can be interfered by a home base station of a different CSG The interference situation depicted in the diagram is just an example. Various interference situations can occur according to a configuration of a network and a UE.

As mentioned in the foregoing description, in case of a macro-pico heterogeneous network, a macro cell may cause very strong interference to a UE of a pico cell, in particular, the pico UE situated at a boundary of the pico cell. Hence, it is required to have a method of cancelling DL/UL interference for a data, a L1/L2 control signal, a synchronization signal, and a reference signal. An inter-cell interference cancellation (ICIC) method can be handled in time, frequency, and/or space domain.

Figure 12:
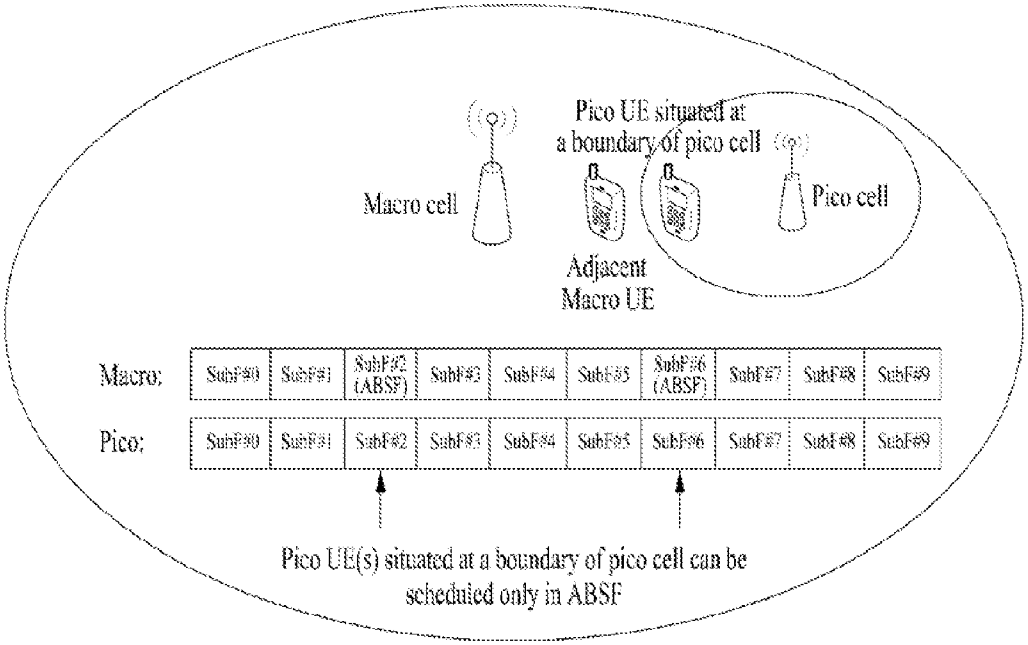
FIG. 12 is a diagram of an example for a method of cancelling an inter-cell interference in a heterogeneous network.

FIG. 12 is a diagram of an example for a method of cancelling an inter-cell interference in a heterogeneous network. For clarity, assume that an object to be protected from inter-cell interference is a pico-UE. In this case, a network node causing interference corresponds to a macro cell (or, a macro base station).

Referring to FIG. 12, the macro cell causing inter-cell interference may be able to assign an ABS (or, an ABSF) (almost blank subframe) in a radio frame. The ABS indicates a subframe (SubF) configured not to transmit a normal DL signal (i.e., limited to transmit a DL signal) except a specific DL signal. The ABS can be repeated to have a constant pattern in more than one radio frame. FIG. 12 shows an example of a case that the ABS is configured to a subframe #2 and a subframe #6. The macro cell informs a pico cell of the ABS configuration via a backhaul and the pico cell may be then able to schedule the pico UE using the ABS configuration. For instance, the pico UE can be scheduled in the ABS interval only. In order for the user equipments situated at the boundary of the pico cell to avoid the interference from the macro cell, the user equipments are scheduled on the time when the ABS is assigned to the macro subframe and may be able to receive a signal having less interference from the pico cell.

Yet, the ABS may be able to include at least one selected from the group consisting of a PSS, an SSS, a PBCH, an SIB1, and a paging signal. And, the ABS may be able to include a CRS signal as well. Hence, there exists a limit to mitigate interference for the pico UE using the ABS. To this end, there may exist one solution of enhancing the interference mitigation using an MBSFN subframe, which does not include a CRS signal in a PDSCH region. Yet, it is not possible to configure all ABSs with the MBSFN subframe only. Moreover, for a basic operation of a legacy UE of the macro/pico cell (e.g., LTE user equipment) or an advanced UE (e.g., LTE-A user equipment), reliability of HARQ ACK/NACK, synchronization channel, system information, and a paging message is should be secured. Hence, in case of assigning the ABS, it may be possible to consider the following content.

1. UL HARQ Timing

A. In order to secure PHICH reliability of a pico cell, ABS assignment should be performed by a unit of 8 ms, which is a transmission cycle of the PHICH (in case of FDD).

2. PBCH and a Synchronization Signal

A. PBCH includes information on a PHICH configuration, a DL band, and system frame number. PSS/SSS signal includes information on synchronization of frequency/time domain and a cell ID. The PBCH and the PSS/SSS are situated in subframe #0 and #5. In order for avoiding the PBCH and the PSS/SSS of the macro cell and the PBCH and the PSS/SSS of the pico cell to be assigned to an identical subframe, it may consider a subframe shift scheme. In particular, by using the subframe shift scheme, a boundary of the macro subframe and the boundary of the pico subframe may be dislocated with each other. Specifically, by shifting a reference point of the pico subframe as much as ‘a’ subframe, the macro subframe ‘N’ may be able to correspond to the pico subframe ‘N+a’ with each other. In this case, the ABS can be assigned to the position of the PBCH and the PSS/SSS of the pico cell.

3. System Information Message

A. SIB1 signal is assigned to a subframe #5 of a radio frame of even number. In order for a UE situated at a boundary of the pico cell to get a transmission reliability of a DL control signal, it may perform an ABS assignment.

4. Paging Message

A. The paging message is positioned at {9}, {4, 9}, or {0, 4, 5, 9} subframe. In order for a UE situated at a boundary of the pico cell to get a transmission reliability of a DL control signal, it may perform an ABS assignment.

In consideration of the aforementioned, a shortest cycle of an ABS pattern consists of 40 subframes. Since one subframe corresponds to 1 ms, ABS assignment may be able to form a pattern of 40 ms unit. ABS pattern information is exchanged via wired/wireless interface between base stations and can be utilized for a scheduling of the UE situated at the boundary of the pico cell. Yet, in order to protect all of the HARQ ACK/NACK, the synchronization channel, the system information, the paging message signal of the pico cell from interference, many numbers of ABS assignments should be performed. Yet, the increase of the number of ABS degrades a throughput of the macro cell. Hence, the ABS assignment should be performed in consideration of a trade-off between the interference mitigation and the cell throughput.

In the following description, a method of mitigating inter-cell interference in a carrier aggregation heterogeneous network system (simply, CA based HetNet) is explained. In the CA based HetNet, each CC is UE-specifically managed in a manner of being divided into a PCC (in other word, PCell) and a SCC (in other word, SCell). A user equipment may be able to configure or eliminate the SCC based on the PCC. This means that the PCC includes important information compared to the SCC does. In order to secure the reliability of the pico PCC, such a conventional scheme as increasing transmit power of the PCC more than that of the SCC, enhancing a channel code rate of the PCC, or maintaining a load balance between component carriers and mitigating interference for the pico PCC by assigning the pico PCC and the macro PCC to component carriers different from each other is proposed. Meanwhile, in order to mitigate interference of the user equipments situated at the boundary of the pico cell, it may be able to consider the ABS assignment in the CA based HetNet as well as in a non-CA based HetNet. In this case, for an efficient interference control, it may be able to independently perform the ABS assignment according to the CC of the macro cell. As one example, in order to mitigate the interference of the pico PCC, which is relatively more important than the pico SCC, the ABS assignment can be done on the macro SCC more than on the PCC.

Figure 13:
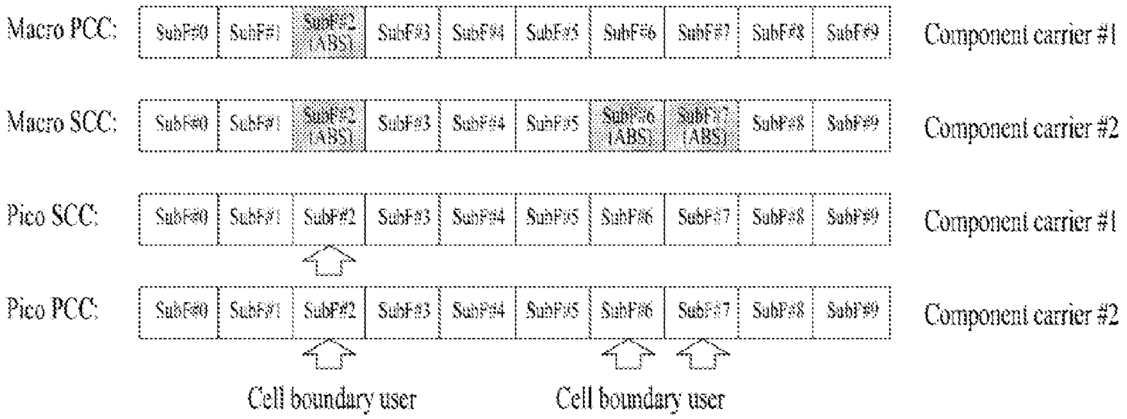
FIG. 13 is a diagram of an example of ABS(Almost Blank Subframe) pattern in a CA based HetNet.

FIG. 13 is a diagram of an example of ABS pattern in a CA based HetNet. For clarity, although the present example shows a case that 2 CCs are aggregated, this is just an example. Various numbers of CC can be aggregated. And, although the present example shows a case that the number of CCs aggregated in the macro cell and the pico cell and the CC index are identical to each other, this is just an example. The number of aggregated CCs, the aggregated CC index and the like can be independently configured according to the macro/pico cell, respectively.

Referring to FIG. 13, CC #1/CC #2 are configured for the macro PCC/SCC, respectively. In order to mitigate interference between PCCs, the CC for the pico PCC and the CC for the macro PCC can be configured differently from each other. According to the present example, CC #2/CC #1 are configured for the pico PCC/SCC, respectively. In case of assigning an ABS in a CA based HetNet, reliability of the pico PCC can be secured by a relatively free ABS assignment of the macro PCC. Yet, the pico PCC may get considerable interference due to the limitation of ABS assignment resulted from a high data load or transmission of important information of the macro PCC.

As mentioned in the foregoing description, although the transmission reliability of the pico PCC can be secured by a relatively free ABS assignment of the macro PCC, the pico PCC may get considerable interference due to the limitation of ABS assignment resulted from a high data load or transmission of important information of the macro PCC. Hence, the pico SCC may get considerable interference due to the macro PCC. This inter-cell interference acts as an interrupting element in obtaining various synchronization and control information (e.g., a cell ID, length of CP, length of PDCCH, antenna configuration, PHICH configuration, and frame number) transmitted via the pico SCC.

In the following description, the present invention proposes a method of avoiding cell throughput degradation due to an ABS assignment and securing transmission reliability of a control channel/information (e.g., a cell ID, CP length, PCFICH, antenna configuration, PHICH configuration, and frame number) provided by a pico cell (preferably, SCC of the pico cell). Specifically, the present invention proposes that at least a part of a subframe among a subframe set assigned as an ABS transmits at least a part of the control channel/information (e.g., the cell ID, CP length, PCFICH, antenna configuration, PHICH configuration, and frame number) of the pico cell. For clarity, according to the present invention, the subframe transmitting the control channel/information of the pico cell is called an ISP (information subframe for pico UE).

Prior to the detail explanation on the present invention, it is apparent that an ISP method proposed by the present invention can be applied to both a single carrier-based heterogeneous network system and a multi-carrier-based heterogeneous network system.

Figures 14, 15, 16:
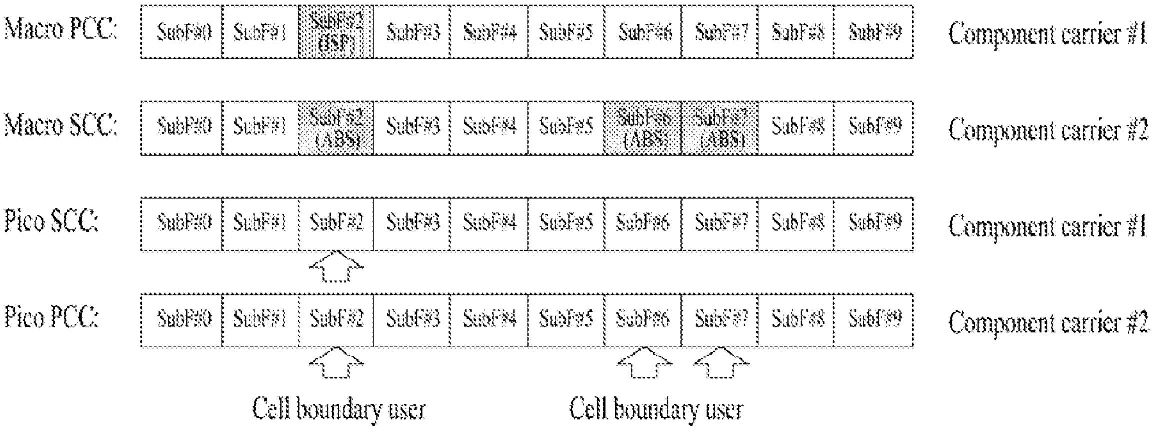
FIG. 14 is a diagram of an example for a method of providing a control channel/information using ISP.
FIG. 15 to FIG. 16 are diagrams of an example for a method of configuring a position of ISP according to embodiment of the present invention.

FIG. 14 is a diagram of an example for a method of providing a control channel/information using ISP. Referring to FIG. 14, at least a part of ABS is assigned as an ISP on the macro PCC when it is compared with FIG. 13. The macro base station provides at least a part of a control channel/information of the pico cell on the macro PCC via the ISP and may be then able to help the pico UE to obtain the control channel/information for the pico SCC (or, a pico PCC). In particular, by utilizing at least a part of the subframe assigned as ABS as the ISP, it may be able to mitigate inter-cell interference and enhance a cell throughput at the same time.

The ISP proposed by the present invention may have characteristics as follows.

1. The information/signal transmitted by the macro base station via the ISP may include information on at least one selected from the group consisting of a cell ID of the pico cell, a length of CP, a length of PDCCH, an antenna configuration, a PHICH configuration, and frame number. Although the ISP can be configured on at least one of the macro PCC and the macro SCC, since the interference due to the macro SCC is mitigated by a relatively free ABS assignment, the ISP may be configured on the macro PCC. The control channel/information transmitted via the ISP may include the information on the control channel/information of the pico cell for a carrier to which the ISP is configured. And, the control channel/information transmitted via the ISP may include the information on the control channel/information of the pico cell for a different carrier to which the ISP is not configured. In case of the latter, the carrier to which the control channel/information transmitted via the ISP is applied can be checked according to a carrier indication information transmitted via the ISP, a signaling between base stations indicating a carrier linkage relationship, or a pre-determined appointment. Although it may be non-limited to the following description, the ISP can be configured as follows. For clarity, assume that the ISP is configured on the macro PCC and the control channel/information of the pico SCC is transmitted in the ISP.

A. The control channel/information (e.g., information on a PSS, an SSS, a PBCH, and a PCFICH) of the pico SCC transmitted in the ISP can be configured/transmitted with the same method of the conventional one (e.g., refer to FIG. 5~FIG. 7). Hence, a user equipment situated at the boundary of the pico cell may be able to obtain at least a part of the control channel/information of the pico SCC (e.g., information on a cell ID, CP length, PDCCH length, antenna configuration, PHICH configuration, and frame number) from the ISP with the same method of the conventional method. Hence, transmission reliability for the control channel/information of the pico SCC transmitted to the user equipment situated at the boundary of the pico cell may be enhanced. Meanwhile, in order for the macro base station to configure the control channel/information of the pico SCC with the same method of the pico base station, information on such a method of configuring synchronization and control channel as a reference signal index, a code rate as well as the information on the cell ID, the CP length, the PDCCH length, the antenna configuration, the PHICH configuration, and the frame number can be exchanged in advance between the macro base station and the pico base station.

B. The control channel/information (e.g., the information on the cell ID, the CP length, the PDCCH length, the antenna configuration, the PHICH configuration, and the frame number) of the pico SCC can spread after coded with a predetermined high code rate. After spreading, the control channel/information of the pico SCC can be transmitted on a pico SCC band for one subframe period. The control channel/information of the pico SCC spreads using a simple repetition or may be able to spread using a sequence used for a synchronization signal or control signal of the pico cell.

C. While configuring the control channel/information like as the aforementioned B, the control channel/information (e.g., the information on the cell ID, the CP length, the PDCCH length, the antenna configuration, the PHICH configuration, and the frame number) of the pico SCC can be transmitted in a manner of limiting to a specific OFDM symbol or a specific frequency domain for an ISP interval without spreading the control channel/information of the pico SCC.

During the ISP interval, the user equipment situated at the boundary of the pico cell receives an identical/corresponding control channel/information from the macro cell and the pico cell, respectively. Hence, the user equipment situated at the boundary of the pico cell may be able to decode data in a manner of performing a joint processing for a signal of the macro cell and the signal of the pico cell during the ISP interval. The joint processing, for instance, includes a spatial multiplexing decoding scheme used for the MIMO (multiple input multiple output) technique.

Meanwhile, in order for the macro cell to transmit the ISP for the pico cell (e.g., pico SCC), the location information on the ISP and the information on the cell ID, the CP length, the PDCCH length, the antenna configuration, the PFICH configuration, the frame number, and the like should be exchanged between the macro base station and the pico base station. Since the informations on the cell ID, the CP length, the PDCCH length, the antenna configuration, the PHICH configuration, and the frame number among the aforementioned information correspond to the informations having a small data load, it may be possible to express the informations with less than 40 bits.

FIG. 15 to FIG. 16 is diagram of an example for a method of configuring a position of ISP. Referring to FIG. 15 and FIG. 16, the position of the ISP can be configured as follows.

1. ABS pattern information is exchanged with a cycle of X (e.g., 40) ms for time domain ICIC and the position of the ABS can be defined in a manner of setting a corresponding bit to '0' or '1' in the X-bits (in particular, a bitmap method). For instance, a subframe to which a corresponding bit value is set to '0' may correspond to a non-ABS (in particular, a normal subframe) and a subframe to which a corresponding bit value is set to '1' may correspond to an ABS. It is possible to configure in reverse. In order to exchange the position of the ISP according to the present invention, X bit bitmap can be used in the same manner with the method of the ABS assignment ('ISP indication bit' of FIG. 15). And, in order to designate the position of the ISP according to the present invention, a reduced form of bitmap can be transmitted to the subframe used to designate the position of the ABS only ('reduced ISP indication bit' of FIG. 15). FIG. 15 shows an example of a case that only 3 subframes are assigned as the ABS among the 40 subframes. According to the 'reduced ISP indication bit', a 3-bit bitmap is used to indicate the position of the ISP. In this case, $1^{st}$ $2^{nd}$, and $3^{rd}$ bit correspond to subframe #1, #3, and #38, respectively. It can be comprehended that the subframe #3 is assigned as the ISP in the diagram. Meanwhile, according to an interpretation of a bit value, it may be possible to interpret that the subframe #1/# 38 are assigned as the ISP.

2. In order to more reduce the overhead due to IPS signaling, a relationship between an ABS pattern and an IPS pattern can be defined in advance. For instance, as shown in FIG. 16, a subframe at which a first ABS pattern is situated among the ABS patterns can be assigned as IPS. In this case, a user equipment may be able to obtain the information on the cell ID, the CP length, the PDCCH length, the antenna configuration, the PHICH configuration, and the frame number even in a situation that the user equipment does not know the position of the ISP. And, the system overhead can be reduced since it is not necessary to exchange the information on the position of the ISP between the base stations or it is able to minimize the amount of exchange of the information. To assign a subframe at which a first ABS pattern is situated among the ABS patterns as an ISP is just an example. It is possible to variously determine the ISP according to a situation between the macro and the pico base station. For instance, the IPS can be defined by such a various pattern as odd number subframe, even number subframe, every $N^{th}$ subframe, first N number of subframe, last subframe, last N number of subframe and the like among the ABS patterns. And, the ISP can be defined using a position of a start subframe and/or a minimum space within an ABS pattern. And, it is possible to identically define the ABS pattern and the IPS pattern. According to a system, it may be able to define a pre-defined plurality of relationships between the ABS pattern and the IPS pattern and it is also possible to signal only the index information indicating one of the aforementioned relationships.

The macro base station configures the ISP in a manner of exchanging the information between the base stations and the pico base station should inform the pico UE of the position of the ISP. In order for the pico UE and the pico base station to exchange the information on the position of the ISP or the information on whether the ISP exists, an higher layer signaling or a specific DCI format of the PDCCH can be used. The pico UE recognizes that a specific subframe corresponds to the ISP and may be then able to more trustworthily receive the control channel/information (e.g., information on the cell ID, the CP length, the PDCCH length, the antenna configuration, the PHICH configuration, and the frame number) on the pico cell or a specific CC of the pico cell in a manner of performing a joint processing.

Figure 17:
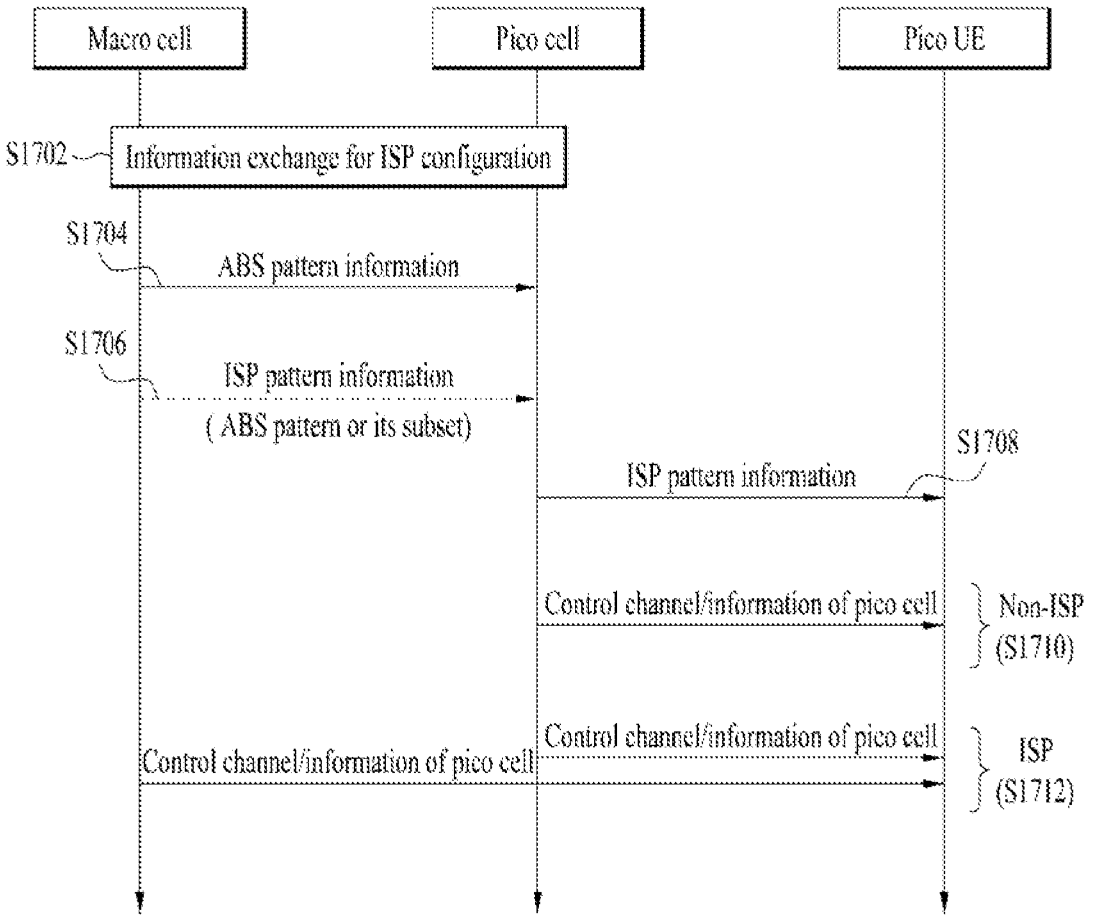
FIG. 17 is a flowchart of an example for a method of providing a control channel/information according to embodiment of the present invention.

FIG. 17 is a flowchart of an example for a method of providing a control channel/information according to embodiment of the present invention.

Referring to FIG. 17, the macro cell and the pico cell exchange information on ISP configuration with each other [S1702]. Although it may be non-limited to this, the information on the ISP configuration may include at least one selected from the group consisting of a cell ID on the pico cell, a length of CP, a length of PDCCH, an antenna configuration, a PHICH configuration, and a frame number. Meanwhile, the macro cell provides ABS pattern information to the pico cell [S1704]. The ABS pattern information can be provided periodically or when necessary. ABS pattern, for instance, may indicate a subframe to which the ABS is assigned thereto among 40 subframes. The ABS pattern can be provided in a manner of setting a bit corresponding to each of the subframes to '0' or '1' in a 40-bit bitmap. And, the macro cell provides ISP pattern information to the pico cell [S1706].

The ISP pattern information may be identical to the ABS pattern or can be provided as a subset of the ABS pattern. Although it may be non-limited to this, the ISP pattern can be provided by a method exemplified with reference to FIG. 15 and FIG. 16. Since the ABS pattern and the ISP pattern have a prescribed relationship with each other, the ISP pattern can be inferred from the ABS pattern. In this case, the step of [S1706] may be omitted or can be used to provide information indicating the relationship of the ABS pattern and the ISP pattern. The pico cell delivers the ISP pattern information to the pico UE as it is or by processing it [S1708].

Thereafter, in case of a subframe configured as a non-ISP, the pico UE may be able to receive a control channel/information of the pico cell from the pico cell only [S1710]. In this case, the macro cell provides the control channel/information of the macro cell to the macro UE. On the contrary, in case of a subframe configured as an ISP, the pico UE may be able to receive the control channel/information of the pico cell from the macro cell and/or the pico cell [S1712]. If a subframe boundary of the macro cell and the pico cell is dislocated by a subframe shift, the control channel/information (e.g., BCH, PSCH/SSCH etc.) of the pico cell can be received in a time section different from the time section of the macro cell. On the contrary, in case that the subframe shift is not applied, the control channel/information (e.g., BCH, PSCH/SSCH etc.) of the pico cell can be received in the time section identical to the time section of the macro cell. In this case, a joint processing can be performed on a signal simultaneously received from the macro cell and the pico cell.

Figure 18:
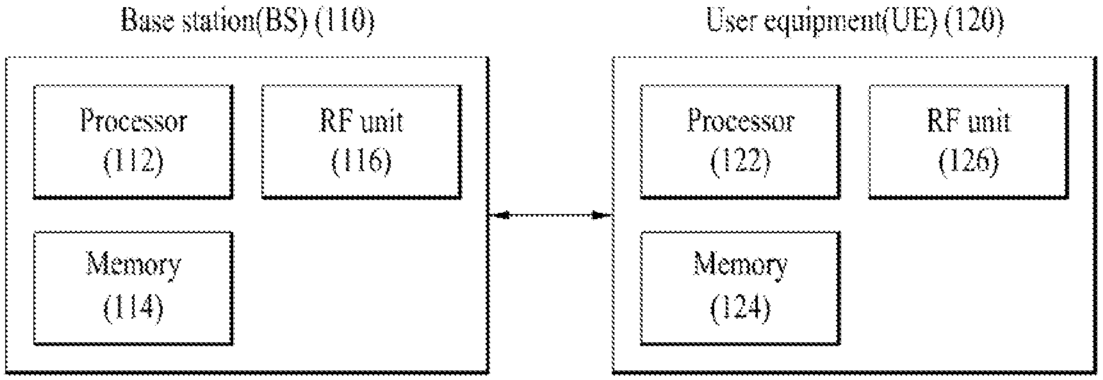
FIG. 18 is a diagram of an example for a base station and a user equipment applicable to one embodiment of the present invention.

FIG. 18 is a diagram of an example for a base station and a user equipment applicable to one embodiment of the present invention. The base station includes a macro base station and a pico base station.

Referring to FIG. 18, a wireless communication system may include a base station (BS) 110, a user equipment (UE) 120. The base station 110 includes a processor 112, a memory 114 and a radio frequency (RF) unit 116. The processor 112 can be configured to implement the procedure and/or methods proposed by the present invention. The memory 114 is connected to the processor 112 and configured to store various information related to the operation of the processor 112. The RF unit 116 is connected to the processor 112 and configured to transmit and/or receive a radio signal. The user equipment 120 includes a processor 122, a memory 124 and a radio frequency (RF) unit 126. The processor 122 can be configured to implement the procedure and/or methods proposed by the present invention. The memory 124 is connected to the processor 122 and configured to store various information related to the operation of the processor 122. The RF unit 126 is connected to the processor 122 and configured to transmit and/or receive a radio signal. The base station 110 and/or the user equipment 120 may include a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified.

Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the signal transmission/reception relations between a user equipment and a base station. In this disclosure, a specific operation explained as performed by a base station can be occasionally performed by an upper node of the base station. In particular, in a network constructed with a plurality of network nodes including a base station, it is apparent that various operations performed for communication with a user equipment can be performed by a base station or other networks except the base station. In this case, 'base station' can be replaced by such a terminology as a fixed station, a Node B, an eNode B (eNB), an access point, and the like. And, 'user equipment' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention can be used by such a wireless communication device as a user equipment, a relay, a base station, and the like.

What is claimed is:

1. A method of transmitting a control information, which is transmitted by a macro base station in a wireless communication system including the macro base station and a pico base station, the method comprising the steps of:

transmitting an assignment information regarding a subframe of a $1^{st}$ set, which is limited to transmit a downlink signal, to the pico base station;

transmitting an assignment information regarding a subframe of a $2^{nd}$ set belonging to the subframe of the $1^{st}$ set to the pico base station; and transmitting a control information via the subframe of the $1^{st}$ set, wherein the control information for the macro base station is transmitted in the subframe not corresponding to the subframe of the $2^{nd}$ set among the subframe of the $1^{st}$ set and wherein the control information for the pico base station is transmitted in the subframe corresponding to the subframe of the $2^{nd}$ set among the subframe of the $1^{st}$ set.

2. The method of claim 1, wherein the subframe of the $1^{st}$ set is an ABS (almost blank subframe).

3. The method of claim 2, wherein the assignment information regarding the subframe of the $1^{st}$ set comprises a 40-bit bitmap and wherein each bit of the bitmap is set to indicate the ABS or a non-ABS by a corresponding subframe.

4. The method of claim 1, wherein the assignment information regarding the subframe of the $2^{nd}$ set is provided using a bitmap of identical size with the bitmap used to indicate the assignment information regarding the subframe of the $1^{st}$ set.

5. The method of claim 1, wherein the subframe of the $1^{st}$ set is indicated using an N bit bitmap, wherein the subframe of the $2^{nd}$ set is indicated using an M bit bitmap, and wherein the M is provided by the number of bit indicating the subframe limited to transmit the downlink signal among the N bit.

6. The method of claim 1, wherein the control information for the pico base station comprises at least one selected from the group consisting of a cell ID (identity), a CP (cyclic prefix) length, a PCFICH (physical control format indicator channel), an antenna configuration, a PHICH (physical HARQ indicator channel) configuration, and a frame number.

7. The method of claim 1, wherein if the subframe of the $2^{nd}$ set is assigned on a $1^{st}$ carrier resource, the control information related to a $2^{nd}$ carrier resource of the pico base station is transmitted in the subframe of the $2^{nd}$ set and wherein the $1^{st}$ carrier resource and the $2^{nd}$ carrier resource are different from each other.

8. A communication device, comprising:

a radio frequency (RF) unit; and a processor, the processor configured to transmit an assignment information regarding a subframe of a $1^{st}$ set, which is limited to transmit a downlink signal, to the pico base station, the processor configured to transmit an assignment information regarding a subframe of a $2^{nd}$ set belonging to the subframe of the $1^{st}$ set to the pico base station, the processor configured to transmit a control information via the subframe of the $1^{st}$ set.

wherein the control information for the macro base station is transmitted in the subframe not corresponding to the subframe of the $2^{nd}$ set among the subframe of the $1^{st}$ set and wherein the control information for the pico base station is transmitted in the subframe corresponding to the subframe of the $2^{nd}$ set among the subframe of the $1^{st}$ set.

9. The communication device of claim 8, wherein the subframe of the $1^{st}$ set is an ABS (almost blank subframe).

10. The communication device of claim 9, wherein the assignment information regarding the subframe of the $1^{st}$ set comprises a 40-bit bitmap and wherein each bit of the bitmap is set to indicate the ABS or a non-ABS by a corresponding subframe.

11. The communication device of claim 8, wherein the assignment information regarding the subframe of the $2^{nd}$ set is provided using a bitmap of identical size with the bitmap used to indicate the assignment information regarding the subframe of the $1^{st}$ set.

12. The communication device of claim 8, wherein the subframe of the $1^{st}$ set is indicated using an N bit bitmap, wherein the subframe of the $2^{nd}$ set is indicated using an M bit bitmap, and wherein the M is provided by the number of bit indicating the subframe limited to transmit the downlink signal among the N bit.

13. The communication device of claim 8, wherein the control information for the pico base station comprises at least one selected from the group consisting of a cell ID (identity), a CP (cyclic prefix) length, a PCFICH (physical control format indicator channel), an antenna configuration, a PHICH (physical HARQ indicator channel) configuration, and a frame number.

14. The communication device of claim 8, wherein if the subframe of the $2^{nd}$ set is assigned on a $1^{st}$ carrier resource, the control information related to a $2^{nd}$ carrier resource of the pico base station is transmitted in the subframe of the $2^{nd}$ set and wherein the $1^{st}$ carrier resource and the $2^{nd}$ carrier resource are different from each other.

* * * * *